Jan. 7, 1936.　　　　　P. E. HELLER　　　　　2,027,039
FILE AND METHOD OF MAKING THE SAME
Filed March 31, 1934
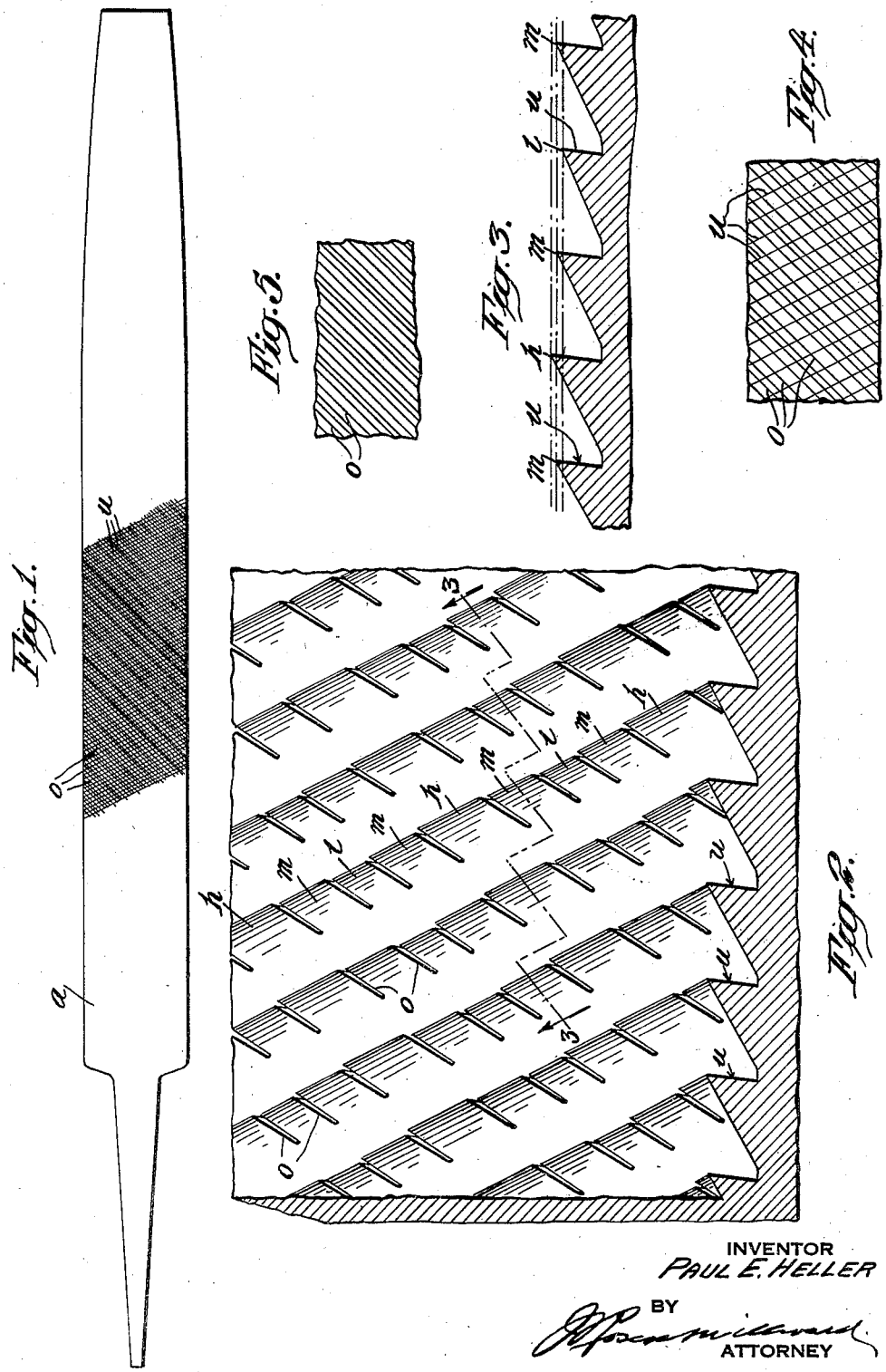
INVENTOR
PAUL E. HELLER
BY
ATTORNEY Patented Jan. 7, 1936

2,027,039

UNITED STATES PATENT OFFICE 2,027,039

FILE AND METHOD OF MAKING THE SAME

Paul E. Heller, Newark, N. J.

Application March 31, 1934, Serial No. 718,382

11 Claims. (Cl. 76—24)

The present invention relates to the art of making files and consists of an improved method of manufacture resulting in a file product adapted for greater efficiency in metal working or cutting than files of the general type heretofore made.

Important characteristics of the novel file produced by the improved method of cutting or punching comprise the formation of uniformly spaced cutting teeth having a slight variation in the elevation of adjacent cutting edges taken in a line parallel to the longitudinal axis of the file. The difference in elevation is desirably very slight, of say one or two-thousandths of an inch varying with the size and cut of the file between axially adjacent or following teeth and the successively acting or axially aligned teeth are arranged with their cutting edges defining an undulating line or repeated rise and fall of elevation and wherein the high points are of relatively close spaced relation. A further angular disposition of the cutting teeth prescribes the condition that in the cutting operation there will at all times be a multiplicity of both high and low elevation teeth active or functioning which, in conjunction with the close spacing aforesaid, insures against chattering or ricochet action. The improved arrangement of the cutting teeth accordingly effects an improved distribution of the cutting action between high and low elevation teeth and materially reduces the cutting resistance so as to give a more uniform and improved cutting action in comparison with the double cut files as commonly made.

The foregoing and other important features and advantages of my improved file will be more fully understood by reference to the accompanying drawing where like reference characters are applied to the corresponding parts in the several views.

In the drawing:

Fig. 1 is a plan view showing my improved file.

Fig. 2 is a perspective view of a portion of a file made in accordance with my invention.

Fig. 3 is a vertical sectional view thereof.

Fig. 4 is a partial plan view showing the improved cutting arrangement.

Fig. 5 is a partial plan view of the blank after the overcutting operation thereon.

In the approved embodiment of my invention as here illustrated, the improved file is formed from the usual blank $a$ first by cutting of the blank with a series of diagonally extending overcuts $o$ for the length of the file and then by producing the cutting teeth, by up-cuts $u$ in reverse oblique or cross-cut relation to the first or overcut. The latter, or up-cut operation is such as to form an under-cut tooth formation in the customary manner while the first, or overcut, is of lesser depth and of simple $v$ cut formation.

In accordance with the present invention, the spacing of the up cuts forming the cutting edges and undercut tooth formation is uniform or of equi-distant spaced relation throughout the length of the file, while the overcuts are of a special successive and variable group spacing adapted for obtaining the desired variations of elevation of the cutting edges.

The successive and variable group spacing of the overcuts as shown, is such as to provide variations in the widths of the teeth formed by a given up-cut in the series order of large, intermediate and narrow tooth widths with a progressive repetition of the variable spacing as shown. The larger tooth widths are approximately equal to the spacing dimension of the up-cuts and the smallest tooth width approximately one-half the width of the larger teeth.

In the upcutting of the teeth by the up-cutting operation it accordingly results that in the formation of the respective under-cut teeth, the chisel will act upon a body or "land" of metal of rhomboidal form or contour, the widths of the adjacent "lands" being varied by the variation in spacing of the overcuts as described. As a result, under the action of the chisel in forming the upcut, there is a greater lateral flow of the metal of the "lands" of lesser width than of the "lands" of increased width and in consequence a slightly lessened elevation of the cutting edge. It therefore follows that the spacing variation as disclosed provides for the formation of teeth of three different elevations. The relative difference in the elevation of adjacent teeth as aforesaid is very slight, approximately one or two one-thousandths of an inch, and is here greatly exaggerated for the purpose of illustration. As here shown, the teeth formed from the "lands" of greatest width are indicated at $h$ and have the highest elevation: the teeth formed from the "lands" of intermediate width are indicated at $m$ and have a slightly lessened or medium elevation and the teeth formed from the "lands" of the least width are indicated at $l$ and have the lowest elevation of their cutting edges.

The variable group spacing of the overcut $o$ is such as to establish a continuous undulation or wave contour of the cutting edges taken on a line parallel to the longitudinal axis of the file.

This repeating rise and fall in the elevation of the cutting edges occurs in the order of high, medium, low, medium, high, etc. as indicated by the characters *h*, *m* and *l* in the drawing. Also, as will be noted, the oblique arrangement of the cross-cuts determines that similar elevation teeth shall be non-aligned axially of the file or positioned in a staggered relation.

The resulting file is adapted for materially greater efficiency than the double-cut files as customarily made by reason of the better distribution of the cutting action resulting from the varied elevations of the cutting edges. Contributing to the improved results, as hereinbefore referred to, is the relatively close spaced relation of the respective groups of teeth defined by the overcuts. In the file shown, the groups occur approximately four to the inch, thereby providing four series of high elevation teeth per inch. This insures a smooth filing action, as will readily be appreciated.

The smoothness of the cutting action is materially furthered by the uniform spacing of the cutting teeth.

While I have shown and described an approved embodiment of my invention, it will be understood that varied modification may be made therein, without departing from the scope of the invention as defined in the appended claims.

Having described my invention, I claim:

1. The herein described method of making files from the usual blanks consisting first in cutting the blank with overcuts arranged in successive groups and spaced to form each tooth in a group of a different width from that of an adjacent tooth and subsequently upcutting the blank in uniform spaced relation and in cross relation to the overcuts thereby to produce teeth having different elevation of the cutting edges resulting from greater lateral displacement of the metal of the teeth of lesser width in the upcutting operation.

2. The herein described method of making files from blanks consisting in cutting the blank with overcuts arranged in longitudinally successive, similar groups of overcuts in varied spaced relation to form each tooth in a group of a different width from that of an adjacent tooth and upcutting the blank in cross relation to the overcuts and with uniform spaced relation, thereby to produce equi-distantly spaced cutting teeth having different elevation of the cutting edges of successively acting teeth resulting from greater lateral flow of the metal of the teeth of lesser width in the upcutting operation.

3. The herein described method of making files from blanks consisting in cutting the blank with overcuts arranged in longitudinally successive, similar groups of overcuts, each group consisting of overcuts having a progressive increase and decrease in spaced relation to form each tooth in a group of a different width from that of an adjacent tooth, and upcutting in cross relation to the overcuts, said upcut being of uniform spacing, thereby to produce equi-distantly spaced cutting teeth having different elevations of the cutting edges of longitudinally adjacent teeth resulting from greater lateral flow of the metal of the teeth of lesser width in the upcutting operation.

4. The herein described method of making files from blanks consisting in cutting the blank with overcuts arranged in longitudinally successive, similar groups of overcuts in varied spaced relation and spaced to form each tooth in a group of a different width from that of an adjacent tooth and upcutting in cross relation to the overcuts and with uniform spaced relation of the upcuts thereby to produce equi-distantly spaced cutting teeth having different elevations of the cutting edges of successively acting teeth and said groups of overcuts occurring substantially four to the inch longitudinally of the blank.

5. The herein described method of making files from blanks consisting in cutting the blank with overcuts arranged in longitudinally successive, similar groups of overcuts, each group consisting of overcuts having a progressive increase and decrease in spaced relation to form each tooth in a group of a different width from that of an adjacent tooth, and upcutting in cross relation to the overcuts, said upcutting being of uniform spacing, thereby to produce equidistantly spaced cutting teeth having different elevations of the cutting edges of longitudinally adjacent teeth and said groups of overcuts occurring approximately four to the inch longitudinally of the blank.

6. The herein described method of making files from the usual blanks consisting first in cutting the blank with overcuts arranged in successive groups of varied spacing overcuts spaced to form each tooth in a group of a different width from that of an adjacent tooth and subsequently upcutting in uniform spaced relation and in cross relation to the overcuts thereby to produce teeth having different elevation as the result of lateral displacement of the metal in the upcutting operation, and said overcuts having a maximum spacing approximately equal to the up-cut spacing.

7. The herein described method of making files from blanks consisting in cutting the blank with overcuts arranged in longitudinally successive, similar groups of overcuts in varied spaced relation to form each tooth in a group of a different width from that of an adjacent tooth and upcutting the blank in cross relation to the overcuts and with uniform spaced relation, thereby to produce equi-distantly spaced cutting teeth having different elevations of the cutting edges of successively acting teeth resulting from greater lateral flow of the metal of the teeth of lesser width in the upcutting operation and said overcuts having a maximum spacing approximately equal to the up-cut spacing.

8. As a new article of manufacture, a file formed with a series of successive groups of overcuts, each group consisting of overcuts in spaced relation to form each tooth in the group of a different width from that of an adjacent tooth and having upcuts in cross relation to the overcuts and in uniform spaced relation, and having its teeth of different elevation resulting from lateral displacement of the metal of the teeth of lesser width in the upcutting operation.

9. As a new article of manufacture, a file formed with a series of successive groups of overcuts, each group consisting of overcuts in spaced relation to form each tooth in the group of a different width from that of an adjacent tooth and having upcuts in cross relation to the overcuts and in uniform spaced relation and having different elevation of the cutting edges of longitudinally adjacent teeth with the narrower teeth of lesser elevation as a result of lateral flow of the metal in the upcutting thereof.

10. As a new article of manufacture, a file formed with a series of succcessive groups of overcuts, each group consisting of overcuts in spaced relation to form each tooth in the group of a different width from that of an adjacent tooth and having upcuts in cross-cut relation to the overcuts and in uniform spaced relation and having different elevation of the cutting edges of longitudinally adjacent teeth, said overcuts having a maximum spacing approximately equal to the up-cut spacing and having its narrower teeth of lesser elevation as a result of lateral flow of the metal in the upcutting operation.

11. As a new article of manufacture, a file formed with a series of successive groups of overcuts, each group consisting of overcuts in spaced relation to form each tooth in the group of different width from that of an adjacent tooth and having upcuts in cross relation to the overcuts and in uniform spaced relation and each group of overcuts having a width whereby a plurality of similar elevation teeth are positioned at each side of the longitudinal axis of the file in any vertical, transverse plane thereof.

PAUL E. HELLER.